United States Patent
Griffiths et al.

(10) Patent No.: US 12,304,841 B2
(45) Date of Patent: May 20, 2025

(54) PFAS REMEDIATION USING HIGH REDOX POTENTIAL FREE-RADICALS

(71) Applicant: PARSONS CORPORATION, Centreville, VA (US)

(72) Inventors: Daniel R. Griffiths, Denver, CO (US); Akshay Chandrashekar Parenky, Syracuse, NY (US)

(73) Assignee: Parsons Corporation, Centreville, VA (US)

( * ) Notice: Subject to any disclaimer, the term of this patent is extended or adjusted under 35 U.S.C. 154(b) by 0 days.

(21) Appl. No.: 18/340,433

(22) Filed: Jun. 23, 2023

(65) Prior Publication Data

US 2023/0348302 A1    Nov. 2, 2023

Related U.S. Application Data

(63) Continuation of application No. 17/344,129, filed on Jun. 10, 2021, now abandoned.
(Continued)

(51) Int. Cl.
*C02F 1/72* (2023.01)
*C02F 1/02* (2023.01)
(Continued)

(52) U.S. Cl.
CPC ............... *C02F 1/725* (2013.01); *C02F 1/02* (2013.01); *C02F 1/722* (2013.01);
(Continued)

(58) Field of Classification Search
CPC .. C02F 1/725; C02F 1/02; C02F 1/722; C02F 2101/36; C02F 2103/06; C02F 2209/003;
(Continued)

(56) References Cited

U.S. PATENT DOCUMENTS 9,409,216 B1    8/2016 Ball
10,519,052 B2   12/2019 Ball
(Continued)

FOREIGN PATENT DOCUMENTS

CA    2989452 A1 * 12/2016 ............. C02F 1/008
KR    20190139031 A * 12/2019
(Continued)

OTHER PUBLICATIONS

Mitchell, S.M., Ahmad, M., Teel, A.L. and Watts, R.J., 2014. Degradation of perfluorooctanoic acid by reactive species generated through catalyzed H2O2 propagation reactions. Environmental Science & Technology Letters, 1(1), pp. 117-121 (Year: 2014).*
(Continued)

*Primary Examiner* — Magali P Slawski
*Assistant Examiner* — Bernadette Karen McGann
(74) *Attorney, Agent, or Firm* — Taft Stettinius & Hollister LLP

(57) ABSTRACT

Oxidation of per- and polyfluoroalkyl compounds (PFAS) contaminated solids and liquids in an in-situ desired zone of treatment using high redox potential free-radicals. An oxidant and a metal catalyst are combined forming a low temperature thermal remediation of PFAS through chemical oxidation in-situ.

20 Claims, 14 Drawing Sheets

Related U.S. Application Data

(60) Provisional application No. 63/145,797, filed on Feb. 4, 2021, provisional application No. 63/038,282, filed on Jun. 12, 2020.

(51) Int. Cl.
  *C02F 101/36* (2006.01)
  *C02F 103/06* (2006.01)

(52) U.S. Cl.
  CPC ...... *C02F 2101/36* (2013.01); *C02F 2103/06* (2013.01); *C02F 2209/003* (2013.01); *C02F 2209/02* (2013.01); *C02F 2303/16* (2013.01); *C02F 2305/023* (2013.01)

(58) Field of Classification Search
  CPC .............. C02F 2209/02; C02F 2303/16; C02F 2305/023; C02F 2209/06; B09C 2101/00; B09C 1/06; B09C 1/08; B09C 1/002; Y02W 10/37
  See application file for complete search history.

(56) References Cited

U.S. PATENT DOCUMENTS

| | | | |
|---|---|---|---|
| 2008/0272063 A1* | 11/2008 | Boulos | A62D 3/38 210/759 |
| 2013/0200303 A1 | 8/2013 | Pancras et al. | |
| 2013/0316433 A1 | 11/2013 | Huang | |
| 2014/0246366 A1 | 9/2014 | Kerfoot | |
| 2016/0223452 A1* | 8/2016 | Milosevic | G03B 17/08 |
| 2018/0282530 A1 | 10/2018 | O'Shea et al. | |
| 2019/0151912 A1 | 5/2019 | Ball | |
| 2019/0226315 A1 | 7/2019 | Laramay et al. | |
| 2019/0241452 A1* | 8/2019 | Ball | C02F 1/725 |
| 2020/0148565 A1 | 5/2020 | Ball et al. | |

FOREIGN PATENT DOCUMENTS

| | | |
|---|---|---|
| WO | 2019/051208 A1 | 3/2019 |
| WO | 2019/169177 A1 | 9/2019 |

OTHER PUBLICATIONS

Machine generated translation of KR-20190139031-A (Year: 2019).*

* cited by examiner

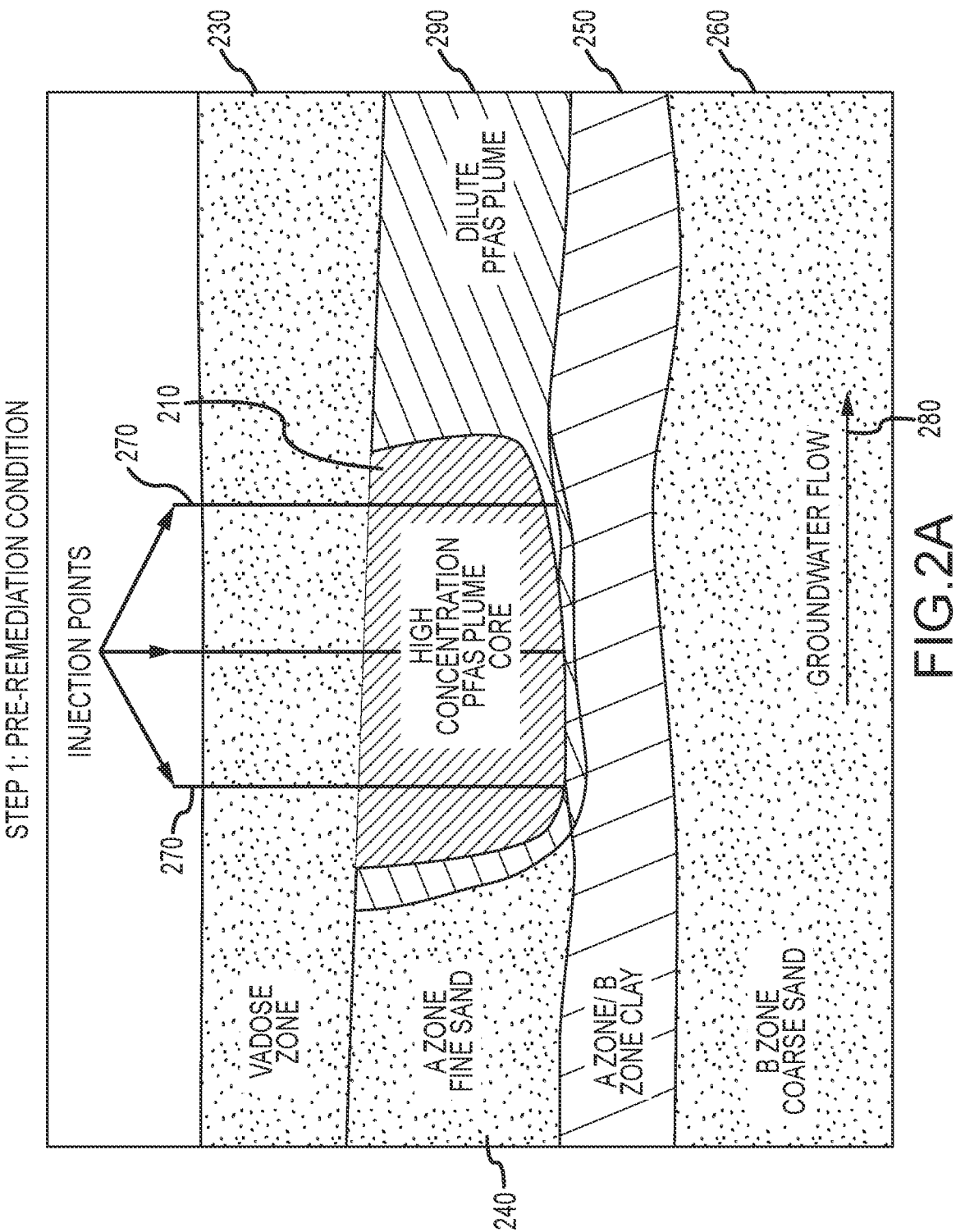

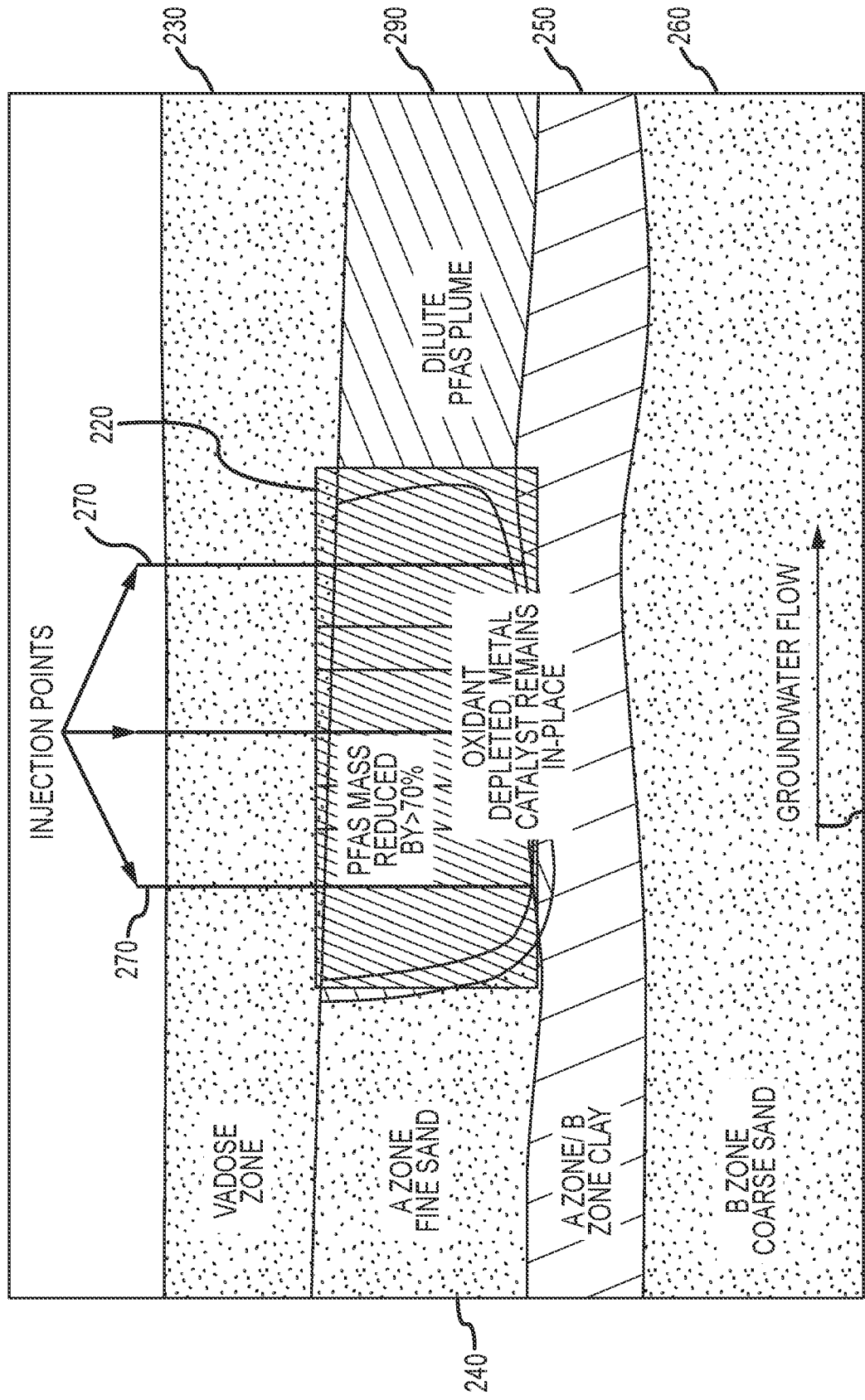

PFAS REMEDIATION USING HIGH REDOX POTENTIAL FREE-RADICALS

RELATED APPLICATION

The present application is a continuation of U.S. patent application Ser. No. 17/344,129, filed 10 Jun. 2021, and claims the benefit of priority to U.S. Provisional Patent Application No. 63/038,282 filed 12 Jun. 2020 and U.S. Provisional Patent Application No. 63/145,797 filed 4 Feb. 2021, all of which are incorporated by reference in their entirety herein.

BACKGROUND OF THE INVENTION

Field of the Invention

The present invention relates to compositions and methods for the remediation of contaminated solids and liquids, in particular the in-situ remediation of solids and liquids contaminated by Perfluoroalkyl substances (PFAS) compounds using an oxidant and a catalyst in a low thermal environment.

Relevant Background

Perfluoroalkyl substances (PFAS) encompasses a family of thousands of individual chemicals used in many industrial and commercial products. PFAS belong to a class of organic chemicals that contain at least one fully fluorinated carbon atom. This moiety is highly hydrophobic and oleophobic resulting in strong water and oil repellent properties. PFAS are thus in common use as lubricants in industrial processes and as additives in insecticides, pharmaceuticals, and aqueous film-forming firefighting foams. PFAS are also widely used as water and oil repellents in consumer products, such as carpeting, upholstery, and paper. As a group, PFAS chemicals are highly resistant to heat, water and oil, making them highly useful for many industrial applications and consumer products ranging from non-stick cookware to stain-resistant fabrics. The same chemical properties that make PFAS so effective in firefighting foams and other products make them particularly hard to remediate. Consequently, PFAS degrade very slowly in the environment and the human body, and contaminated sites are difficult to remediate.

Communities across the country have become concerned about PFAS accumulation and their lack of natural degradation in the environment, and many experts have declared PFAS an emerging major health threat. Known implications of PFAS contamination include negative effects on fetal development, learning and behavior in children, adult fertility, hormonal balance, and/or liver function.

Decomposition of PFAS through biological means have shown limited transformation and applicability. A common disposal technique is using incineration wherein concentrated PFAS stream and some of the PFAS-laden material is incinerated at temperatures above 1000° C. to undergo thermal oxidation. Conventional water treatment technologies have been assessed for PFAS removal with mixed success. Some of the technologies explored include adsorbents, membranes, and advanced oxidation processes. A number of conventional sorbents have been explored for PFAS capture but have yet to be validated as a viable commercial means of remediation. Removal of PFAS can be achieved by activated carbon, inorganic sorbents and ion exchange resins. But what plagues all sorbent processes is the need to regenerate or dispose of the exhausted sorbent. Regeneration may require harmful chemicals or expensive equipment and results in PFAS being eluted from the sorbent, where they must then be dealt with again. Disposal of the sorbent is wasteful and still risks release of PFAS depending on the disposal method. Another strategy is to physically separate the PFAS using a membrane; reverse osmosis and nanofiltration are examples. However, also like sorbents, they have the main drawback that they fail to destroy the PFAS molecules. As they remove the PFAS, they create a concentrated stream containing PFAS that must be managed.

Previously perfluoroalkyl compounds have been shown to be treated with fine oxygen/ozone gas bubbles delivered with a hydroperoxide coating and solution activated by high temperature. Ex-situ remediation technology through a reactor has been attempted as has an enzyme catalyzed reaction. All the claimed technologies are cumbersome requiring high energy and complex technologies making the remediation less feasible and commercially impractical.

The only recognized way to destroy the PFAS is through chemical oxidation (or mineralization). Chemical oxidation often entails the utilization of oxidants like hydrogen peroxide (HP) ($H_2O_2$), persulfate (PS) ($S_2O_8^{2-}$), and peroxymonosulfate (PMS) ($HSO_5^-$), but all are known to be ineffective by themselves to decompose PFAS under ambient conditions. Attention has therefore been given to advanced oxidation technologies (AOTs), which utilize strong transient oxidizing species such as hydroxyl radicals (HRs) (·OH) and sulfate radicals (SRs) (SO4SO4·$^-$). The HRs can be practically generated under ambient conditions via activation of HP with iron (Fe), commonly known as the Fenton reaction. However, the Fenton reaction, proven to work for a variety of persistent organic chemicals, has not yet been reported to be effective for PFAS in more oxidized forms, such as PFOA and PFOS. In fact, research studies involving AOTs introduced additional working mechanisms such as photolysis, thermolysis, and sonolysis along with HR and SR mechanisms to decompose PFAS more effectively. They include $H_2O_2$/ultraviolet (UV) photo-Fenton, $TiO_2$/UV photocatalysis, and sonochemical processes for HR generation, as well as $S_2O_8^{2-}$/UV, $HSO_5^-$/UV, and $S_2O_8^{2-}$/microwave for SR generation. PS, one of the most widely used oxidants during in-situ chemical oxidation processes, was reported to require high temperatures at around 60° C.-90° C. to decompose exclusively PFCAs such as PFOA, but PFSAs such as PFOS were not decomposed even under these conditions. Activation methods for PS by ultraviolet, ultrasound, microwave, and/or heat have been attempted. In spite of their effectiveness, these technologies commonly require extreme conditions, leading to higher costs and lowering the potential for their commercial or even technical viability.

Thus, while various known techniques are available for the reduction of PFAS compounds, such methods do not generally provide a practical, affordable technology for remediating soil and water sources under ambient conditions by using low energy and low cost means of generating high redox potential radicals. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

One or more embodiments of the present invention provide a method for remediation of PFAS compounds from a desired zone of treatment, in particular contaminated soils and water supplies, such as ground water and other water bodies at ambient or near ambient conditions. It is an aspect of embodiments of the invention to provide a continuous process and system for the in-situ remediation of large-scale contaminated soil and ground water sites that quickly reduce the contaminants to acceptable levels, allowing the resources to once again enter normal use or consumption. The remediation is carried out at ambient or near-ambient conditions using low energy (ambient energy in many cases) and low-cost means.

One aspect of the present invention is to provide methods for the remediation of large scale PFAS contaminated soil and ground water sites wherein remediation times are on the order of few days to several years.

It is another aspect of embodiments of the invention to provide compositions and methods for the decomposition of PFAS under ambient conditions by using practical technologies for full-scale applications.

Another aspect of embodiments of the present invention is to provide a process for in-situ reduction of (PFAS) compounds in a desired zone of treatment which can be safely regulated and limited based on the degradation profile of PFAS.

It is one aspect of embodiments of the present invention to provide a method of generating high redox potential free-radials that could oxidize PFAS containing carboxylic acids as the functional group, such as 8:2 fluorotelomer carboxylic acid, 6:2 fluorotelomer carboxylic acid, perfluorooctanoic acid (PFOA), perfluorononanoic acids (PFNA), perfluoroheptanoic acid (PFHpA), perfluorohexanoic acid (PFHxA), perfluoropentanoic acid (PFPeA), perfluorobutanoic acid (PFBA), pentafluoropropionic acid (PFPA) and trifluoroacetic acid (TFA) in the desired zone of treatment.

It is another aspect of embodiments of the present invention to provide a remediation formula comprising of a peroxy-based or a sulfur-based material acting as an oxidant along with a metal acting as a catalyst for the quick generation of high redox potential free-radicals wherein the molar ratio of oxidant to catalyst is on the order of 1:10-1:250. In embodiments where an oxidant and metal catalyst are each used, these compounds may be used at different molar ratios; for example the molar ratio of oxidant to metal catalyst may be 1:10, 1:50, 1:100, 1:150, 1:200, 1:250 depending upon Soil Oxidant Demand (SOD). In an embodiment the results of SOD tests will be used alone or in combination with site characterization data to estimate the quantity and ratio of oxidant and catalyst.

One aspect of embodiments of the present invention is to provide a method of treating a desired zone at low thermal environment in the presence of a metal catalyst and an oxidant. The method includes the steps of calculating SOD value, which is used to estimate the quantity and ratio of oxidant and metal catalyst, and verifying an ambient in-situ thermal environment within the desired zone of treatment having a temperature >20° C. If the temperature is <20° C., the desired temperature is achieved by injecting hot water or similar sources of energy. Once the required low thermal environment is achieved, a transition metal catalyst is injected and dispersed into the ambient in-situ thermal environment creating an ambient in-situ thermal catalyst rich environment. Next an oxidant is introduced wherein the catalyst and the oxidant within the ambient in-situ thermal catalyst rich environment interact generating high redox potential free-radicals that oxidize PFAS compounds producing, inter alia, fluoride and carbon dioxide.

An aspect of the present invention includes reacting the oxidant and the metal catalyst in an ambient in-situ thermal environment, wherein the temperature is ≥20° C. and ≤35° C. or is ≥20° C. and ≤30° C. or is ≥20° C. and ≤40° C. or is ≥20° C. and ≤50° C. or is ≥20° C. and ≤60° C. According to the present invention at temperatures ≥40° C., PFOA decomposition kinetics are much faster and, as one of reasonable skill in the art will appreciate, PFOA decomposition kinetics are faster as temperature/energy increases. Almost complete decomposition of PFAS compounds can be achieved within hours.

It is one aspect of embodiments of the present invention to provide a method for the decrease of PFAS compounds using an oxidant along with a metal catalyst wherein the metal catalyst is regenerated after each cycle of oxidation while the oxidant gets consumed after generating the high redox potential free-radicals.

It is an objective of the invention to provide a method for decreasing PFAS mass significantly or appreciably in a treatment zone with no or minimal added energy.

It is a further aspect of the present invention to provide a method wherein the process is monitored and controlled by observing the concentration of fluoride in groundwater. The amount of PFAS degraded is assessed by the concentration and the rate of change of the concentration of fluoride released into the groundwater. The injection of oxidant, and/or catalyst, into the ambient in-situ thermal environment is continued until no further increase in fluoride concentration is observed in groundwater.

It is another aspect of embodiments of the invention to provide a method to remediate the source area (vadose zone) soils by flushing water containing oxidant and catalysts from ground surface downward through the vadose zone.

It is another aspect of embodiments of the invention to provide a method to prevent contamination of groundwater by destroying PFAS compounds while they are flushed through the vadose zone.

Yet another aspect of the present invention includes a method of establishing the ambient in-situ thermal environment through active heating generated by mechanical, electrical or chemical sources, or passive heating through solar heating of the desired zone of treatment.

This brief summary is neither intended nor should it be construed as being representative of the full extent and scope of this disclosure. Moreover, references made herein to "the present invention" or aspects thereof, should be understood to mean certain embodiments and should not necessarily be construed as limiting all embodiments to a particular description. The present invention is set forth in various levels of detail in the Summary of the Invention as well as in the Detailed Description and Examples and no limitation as to the scope is intended by either the inclusion or non-inclusion of elements, components, etc. in this Summary of the Invention. Additional aspects will become more readily apparent from the Detailed Description, particularly when taken together with the examples.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 2A is a perspective view of the area containing high PFAS concentration with proposed injection points for in-situ remediation of PFAS depicting Step-1 of the process in accordance with one embodiment of the present invention;

FIG. 2B shows Step-2 of remediation of PFAS concentration after initial injection metal catalyst and oxidant wherein the oxidant is consumed, leaving the metal catalyst in place, in accordance with one embodiment of the present invention;

Figure 1:
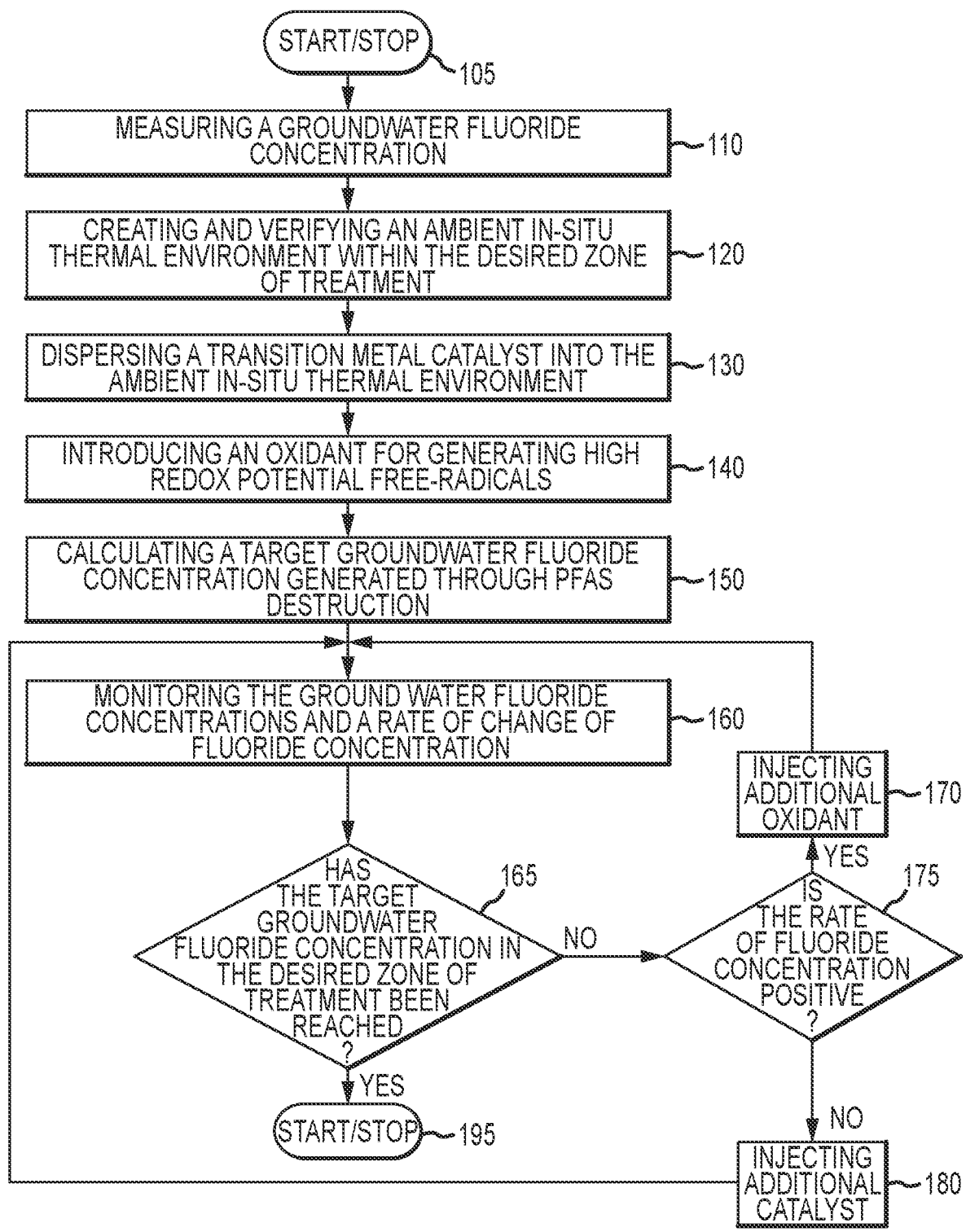
FIG. 1 is a schematic flow diagram illustrating components and operation of an PFAS remediation system in accordance with one embodiment of the present invention.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

Continuous remediation of per- and polyfluoroalkyl compounds (PFAS) in a desired zone of treatment is hereafter described by way of example. In particular, embodiments of the present invention relate to the in-situ treatment of solids and liquids by a particular combination of reagent and conditions. The reagents include an oxidant and a metal catalyst. Disclosed methodology combines low-temperature thermal remediation with chemical oxidation to destroy poly and perfluoroalkyl substances in-situ. The disclosed methods enhance destruction of organic contaminants in the desired zone of treatment. The present invention also relates to a method for applying the remediation compositions to contaminated sites and controlling the process by monitoring and thereby actively modifying the degradation event to achieve maximum abatement of PFAS.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

As used herein, the term "in-situ" refers to an on-site (action). It is to be understood that in some cases, the disclosed methods may be applied either in-situ or ex-situ, or a combination or both in-situ and ex-situ, depending on the desired application. The following descriptions are thus intended to apply to both in-situ and/or ex-situ treatment methods, except as otherwise explicitly stated.

As used herein, the term "PFAS" is used as a general term to represent perfluoroalkyl or polyfluoroalkyl substances. Such substances include perfluorooctanesulfonic acid (PFOS), perfluorooctanoic acid (PFOA), perfluorooctanesulfonamide (PFOSA), perfluorohexanoic acid (PFHxA), perfluoropentanoic acid (PFPeA), pentafluorobenzoic acid (PFBzA), perfluorobutanoic acid (PFBA), perfluorohexanesulfonic acid (PFHxS), perfluorobutanesulfonic acid (PFBS), perfluorodecanoic acid (PFDA), perfluorododecanoic acid (PFDoA), perfluoroheptanoic acid (PFHpA), perfluorononanoic acid (PFNA), perfluoroundecanoic acid (PFUnA), perfluorononanoic acid (PFNA), hexafluoropropylene oxide-dimer acid (HFPO-DA), perfluoro-2-methoxyacetic acid (PFMOAA), perfluoro-2-mthoxypropionic acid (PMPA), fluorotelomer, or any combination thereof. In one embodiment, the fluorotelomer comprises fluorotelomer sulfonate (FTSA) or fluorotelomer carboxylate (FTCA).

As used herein, the term "PFAS-contaminated site" refers to an area of land that has per- and/or polyfluoroalkyl substances in its surface and subsurface soils, sediments, aquifer materials, any significant accumulation of water or water body and/or groundwater.

As used herein, the term "soil" refers generally to any solid or porous material or media that may be contaminated with PFAS and may be treated according to the methods described herein. Soil may comprise natural inorganic matter and/or bulk natural organic matter. Soil may comprise man-made porous material.

As used here, the term "degrade" refers to breaking one or more chemical bonds of a substance. One of many openings or void spaces in a solid substance of any kind are referred to as pores. Pores are characterized by their diameters. The term nanopore generally refers to pores having an average diameter of 100 nm or less.

As used here, the term "GenX" refers to the technologies and chemicals used to make certain fluoropolymers without the use of perfluorooctanoic acid (PFOA). The technology relies on hexafluoropropylene oxide (HFPO) dimer acid and its ammonium salt. An exemplary GenX compound is undecafluoro-2-methyl-3-oxahexanoic acid (or perfluoro-2-methyl-3-oxahexanoic acid).

As used here, the term "Metal" in a metal catalyst includes Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, In, Ca and mixtures thereof used with or without a support material such as zeolite, silica or alumina.

As used here, the term "zone of treatment" refers to an area of land that has per- and/or polyfluoroalkyl substances in its surface and subsurface soils, sediments, aquifer materials, any significant accumulation of water or water body and/or groundwater refers to the area where PFAS-contaminated soil has been treated or remediated such that the level of PFAS contamination in the soil is less than it was prior to being treated or remediated.

Regulated organic contaminants in the subsurface environment include, but are not limited to: polychlorinated biphenyls (PCBs); chlorinated volatile organic compounds (CVOCs), such as tetrachloroethene (PCE), trichloroethene (TCE), trichloroethane (TCA), dichloroethene (DCE), vinyl chloride; fuel constituents such as benzene, ethylbenzene, toluene, xylene, methyl tertbutyl ether (MTBE), tertiary butyl alcohol (TBA), polycyclic aromatic hydrocarbons (PAHs), ethylene dibromide (EDB); pesticides such as (but not limited to) DDT; herbicides such as (but not limited to) Silvex. Pharmaceuticals, personal care products, Endocrine disruptor compounds, aqueous film-forming foam (AFFF), coatings are other products that also may contain highly recalcitrant chemicals and other man-made xenobiotic compounds.

In the interest of clarity, the following terms are further defined.

By the term PFAS is meant per- and polyfluoroalkyl substances. PFAS are a group of man-made chemicals that includes PFOA, PFOS, GenX, and many other chemicals. PFAS have been manufactured and used in a variety of industries around the globe, including in the United States since the 1940s. PFOA and PFOS have been the most extensively produced and studied of these chemicals.

By the term PFOA is meant perfluorooctanoic acid. PFOA, also known as C8, is a man-made chemical. It has been used in the process of making Teflon and similar chemicals (known as fluorotelomers). PFOA is considered a surfactant, or fluorosurfactant, due to its chemical structure, which consists of a perfluorinated, n-octyl "tail group" and a carboxylate "head group". The head group can be described as hydrophilic while the fluorocarbon tail is both hydrophobic and lipophobic. The tail group is inert and does not interact strongly with polar or non-polar chemical moieties; the head group is reactive and interacts strongly with polar groups, specifically water. The "tail" is hydrophobic due to being non-polar and lipophobic because fluorocarbons are less susceptible to the London dispersion force than hydrocarbons.

By the term PFOS is meant perfluorooctanesulfonic acid. PFOS (conjugate base perfluorooctanesulfonate) is an anthropogenic fluorosurfactant and global pollutant. PFOS is the key ingredient in a fabric protector, and numerous stain repellents. PFOS can be synthesized in industrial production, or it can result from the degradation of precursor molecules. PFOS levels that have been detected in wildlife are considered high enough to affect health parameters, and recently higher serum levels of PFOS were found to be associated with increased risk of chronic kidney disease in the general US population.

By the term GenX is meant the trade name for a technology that is used to make high performance fluoropolymers (e.g., some nonstick coatings) without the use of perfluorooctanoic acid (PFOA). HFPO dimer acid and its ammonium salt are the major chemicals associated with the GenX technology. GenX chemicals have been found in surface water, groundwater, finished drinking water, rainwater, and air emissions in some areas. As part of EPA's draft toxicity assessment, EPA has developed draft oral reference doses (RfDs) for GenX chemicals.

By the term remediation is meant the action of remedying something, in particular of reversing or stopping environmental damage.

By the term groundwater is meant water held underground in the soil or in pores and crevices in rock.

By the term catalyst is meant a substance that increases the rate of a chemical reaction without itself undergoing any permanent chemical change.

By the term support material is meant an organic or inorganic material upon or into which the catalyst is embedded and its exposed to the oxidant to generate the radical species used in the decomposition process.

By the term in-situ is meant situated in the original place. In the context of the present invention it refers to a clean-up or remediation of a polluted site performed using processes in the soil.

By the term ex-situ is meant off site. In the context of the present invention it refers to the remediation of a polluted site where contaminated soil or water is excavated and cleaned elsewhere, off site.

By the term oxidant is meant an agent (oxidant, oxidizer), or oxidizing agent (oxidizer) being a substance that has the ability to oxidize other substances—in other words to accept their electrons. Common oxidizing agents are oxygen, hydrogen peroxide and the halogens. In one sense, an oxidizing agent is a chemical species that undergoes a chemical reaction in which it gains one or more electrons. In that sense, it is one component in an oxidation-reduction (redox) reaction. In the second sense, an oxidizing agent is a chemical species that transfers electronegative atoms, usually oxygen, to a substrate. Combustion, many explosives, and organic redox reactions involve atom-transfer reactions.

By the term free radical is meant a molecule (typically highly reactive and short-lived) having an unpaired valence electron. Normally, a free radical is any molecular species capable of independent existence that contains an unpaired electron in an atomic orbital. The presence of an unpaired electron results in certain common properties that are shared by most radicals. Many radicals are unstable and highly reactive. They can either donate an electron to or accept an electron from other molecules, therefore behaving as oxidants or reductants.

By the term redox potential is meant the measurement of the tendency of an environment or chemical species to oxidize or reduce substrates. The redox potential is a measure of the tendency of a chemical species to acquire electrons from or lose electrons to an electrode and thereby be reduced or oxidized. Redox potential is measured in volts (V), or millivolts (mV) and often represented as Eh. Each species has its own intrinsic redox potential; for example, the more positive the reduction potential (reduction potential is more often used due to general formalism in electrochemistry), the greater the species' affinity for electrons and tendency to be reduced. In aqueous solutions, redox potential is a measure of the tendency of the solution to either gain or lose electrons when it is subjected to change by introduction of a new species. A solution with a higher (more positive) reduction potential than the new species will have a tendency to gain electrons from the new species (i.e. to be reduced by oxidizing the new species) and a solution with a lower (more negative) reduction potential will have a tendency to lose electrons to the new species (i.e. to be oxidized by reducing the new species). Because the absolute potentials are next to impossible to accurately measure, reduction potentials are defined relative to a reference electrode. Reduction potentials of aqueous solutions are determined by measuring the potential difference between an inert sensing electrode in contact with the solution and a stable reference electrode connected to the solution by a salt bridge. An aerobic soil, which is an oxidizing environment, has an Eh of +800 mV; an anaerobic soil, which is a reducing environment, has a negative Eh which can reach −300 mV. Oxygen is found in soils at a redox potential of about +800 mV. When soil is placed in a closed container, oxygen is used by aerobic organisms as a terminal electron acceptor until all of it is depleted. As this process occurs, the redox potential of the soil decreases, and other compounds can be used as terminal electron acceptors.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will also be appreciated that the terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Included in the description are flowcharts depicting examples of the methodology which may be used to remediate PFAS. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements.

Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for PFAS remediation using the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

A method of remediation of soil/groundwater containing PFAS compounds and a system in which the method is implemented is herein disclosed. FIG. 1, in combination with FIGS. 2A-2C provide a methodology flow chart of an illustrative system for PFAS remediation.

One aspect of the present invention is the ability to remediate PFAS in-situ. FIGS. 2A-2C provide a cutaway view of a typical in-situ environment contaminated with a high concentration PFAS plume. One of reasonable skill in the relevant art will appreciate that the PFAS plume is three dimensional and likely, nonuniform. Accordingly, the depiction shown in FIGS. 2A-2C are illustrative of an environment that may be treated by the present invention rather than of an actual ground/soil substructure.

In the present example, a plurality of ground injection points 270 traverse a vadose zone 230 prior to reaching a PFAS plume core 210. The vadose zone, also termed the unsaturated zone, is the part of Earth between the land surface and the top of the phreatic zone, the position at which the groundwater (the water in the soil's pores) is at atmospheric pressure ("vadose" is from the Latin word for "shallow"). Hence, the vadose zone extends from the top of the ground surface to the water table. Water in the vadose zone has a pressure head less than atmospheric pressure and is retained by a combination of adhesion (funicular groundwater), and capillary action (capillary groundwater). If the vadose zone envelops soil, the water contained therein is termed soil moisture. In fine-grained soils, capillary action can cause the pores of the soil to be fully saturated above the water table at a pressure less than atmospheric. The vadose zone does not include the area that is still saturated above the water table, often referred to as the capillary fringe.

Figure 2C:
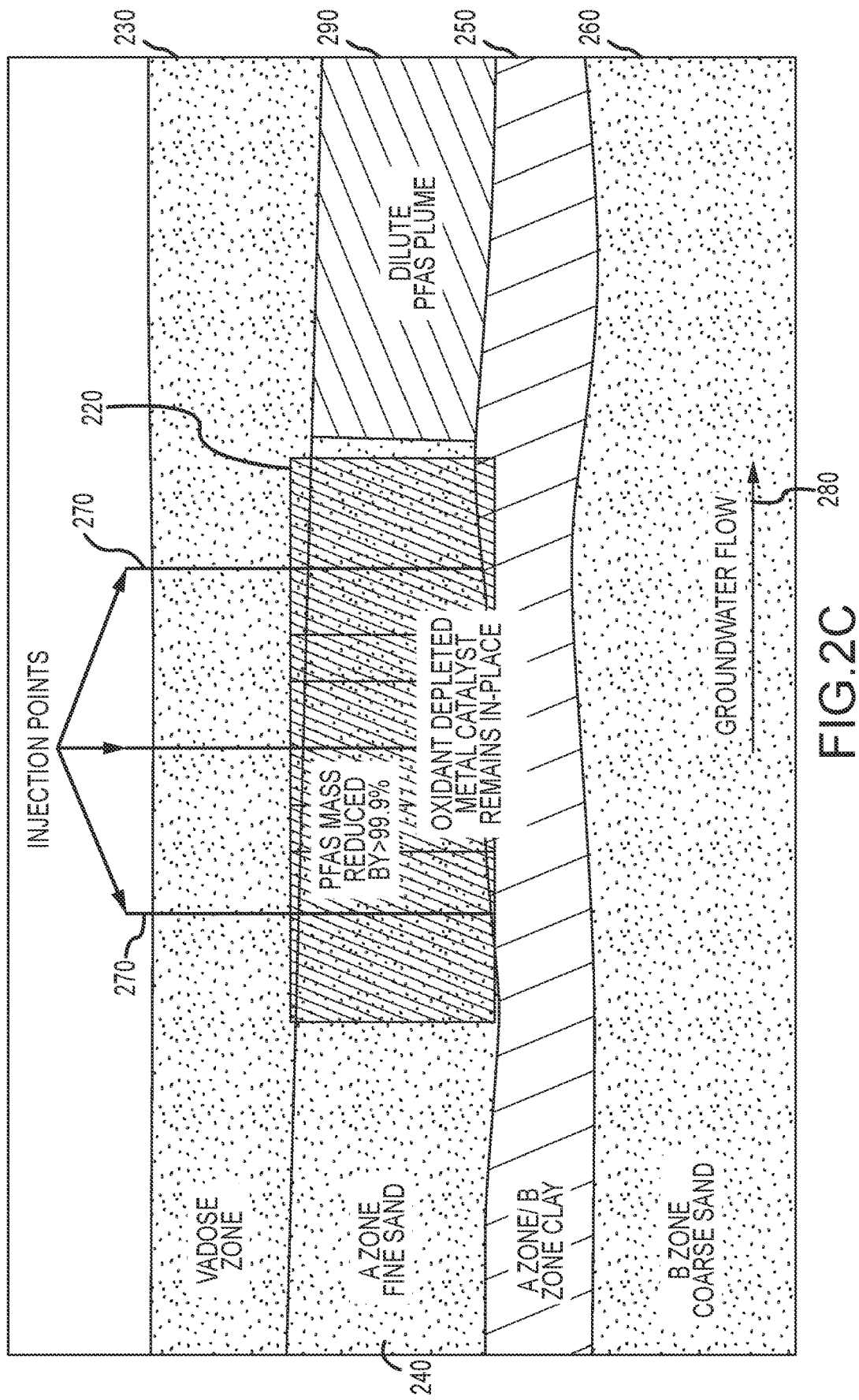
FIG. 2C shows Step-3, subsequent injection of oxidant to achieve near complete destruction of PFAS in-situ in accordance with one embodiment of the present invention.

In the example presented in FIGS. 2A-2C the vadose zone 230 transitions to a zone of fine sand 240 followed a zone of clay 250. The clay zone 250, in this example separates the PFAS plume from a zone of course sand 260. Groundwater 280 is illustrated as flowing from left to right. Accordingly a dilute PFAS plume 290 is created downstream of the core PFAS plume 210. While the presented strata are illustrative of many grounds/soil compositions/structures, they clearly may vary and are illustrative, not controlling. Indeed the variance in structure and composition of the ground strata is contemplated by the present invention and is not limiting as to PFAS remediation techniques and processes of the present invention.

With attention to FIG. 1 and FIG. 2B, a desired zone of treatment 220 is first selected and demarcated. The presence of organics (contaminants or just natural organic material), termed "soil oxidant demand" or just "baseline oxidant demand" within the treatment zone is considered as is other oxidizable organic material representing an oxidant sink. This is the same for a standard chemical oxidation application design. During a typical design of the present invention, soil samples are collected to determine soil oxidant demand then all the other contaminant oxidant demands are added on top to arrive at the minimum oxidant load, which is then doubled or tripled to add a safety factor.

Initial groundwater samples are collected to measure 110 the zero-hour fluoride concentration range, SOD value and pH conditions. Fluoride is generally not present at very high concentrations in natural groundwater but within a source area or plume core fluoride concentrations likely vary significantly. This fluoride concentration range is the basal level fluoride concentration and serves as a control and comparison point for subsequent measurements of fluoride concentrations in groundwater. Initial pH conditions are used to optimize the injection design and ensure that pH conditions are appropriate for PFAS destruction. In the event that natural pH is caustic, weak acids are injected to reduce pH to within the neutral range. Along with fluoride levels, pH is constantly monitored throughout. This is followed by measuring and/or creating the in-situ thermal environment 120 to ensure that the temperature of the desired zone of treatment is at least 20° C. SOD value is used to estimate the quantity and ratio of oxidant and metal catalyst.

According to one embodiment of the present invention neutral to acidic pH conditions are critical to the preferential generation of higher redox potential radicals (SRs) over lower redox potential radicals (HRs). Therefore, the initial pH conditions are adjusted to pH 2.0-3.0 to get the maximum extent of PFAS degradation. The pH of the ground water is monitored from time to time to ensure high degradation rates of PFAS. SRs can simultaneously oxidize refractory organic matters and PFAS present in treated zone under optimal reaction conditions.

According to one embodiment of the present invention the required temperature for remediating PFAS compounds is 20 to 60° C. or higher. The in-situ temperature of the treatment zone is achieved and maintained through, in one embodiment, hot water injection. In other embodiments the natural ground temperature is greater than 20° C. while in other embodiments electrical/solar heating elements increase the in-situ thermal environment.

Once the in-situ thermal environment is created a first dispersal 130 of metal catalyst is injected into the in-situ thermal environment creating a catalyst rich environment. With a now thermally sufficient, catalyst rich environment, an oxidant is thereafter introduced 140. This injection creates optimal reaction conditions wherein the catalyst and the oxidant within the in-situ thermal catalyst rich environment interact, generating high redox potential free-radicals oxidizing PFAS compounds indicated by the release of measurable fluoride. With a reaction taking place a target fluoride concentration is calculated 150. The target fluoride concentration is based on observed reaction rates and normal fluoride concentration in the surrounding environment.

In one embodiment, the PFAS substances are present in the PFAS-contaminated soil in a range of about 0.05 mg/L or 0.05 parts per million (ppm) or less to about 40 mg/L or 40 ppm or more. In one embodiment, the PFAS substances are present in the PFAS-contaminated soil in an amount of about 10 mg/L or 10 ppm. The molar ratio of oxidant to catalyst according to illustrative embodiments of the method is of the order of 1:10-1:250. In other embodiments of the invention the ratio may span 1:50-1:150 or, in yet other embodiments be as narrow as 1:150-1:250. A key aspect 300. In one version of the invention the metal catalyst is substantially regenerated for each cycle of oxidation. In such an instance, the groundwater fluoride concentration as well as the rate of increase of fluoride concentration is monitored 160 after each treatment reaction to confirm PFAS remediation is ongoing. As the reaction takes place additional oxidant is added to the same zone to achieve up to 99.9% reduction in PFAS mass or until no further increase in groundwater fluoride concentration is observed. In another version, additional catalyst is injected to return the treatment zone to its original state. If at this point the target fluoride concentration has been reached 165 the process can terminate 195 indicative of substantial PFAS remediation. In an instance in which the target fluoride concentration has not yet been obtained and the rate of change of the fluoride concentration remains positive, additional oxidant 170 may be added to sustain the generation of free radicals for PFAS remediation. In an instance in which the target fluoride concentration has yet to be achieved yet and the rate of change of concentration is substantially zero 175, further oxidant is unlikely to achieve the desired result. Rather additional catalyst is applied 180 to once again interact with the oxidant and PFAS raising the rate of remediation until the target fluoride concentration is obtained.

In an embodiment of the invention the metal catalyst may be replenished in the zone of treatment to achieve higher orders of oxidation reaction after monitoring the rate of release of fluoride in groundwater.

Changes in the concentration of fluoride is used for determining soil/groundwater (in-situ) reacted PFAS concentration within the desired zone of treatment and to ascertain the requirement of additional oxidant/catalyst. The incubation time for the degradation of PFAS compounds according to illustrative embodiments of the method include approximately 48 to 72 hrs, with complete degradation of PFAS compounds achieved by subsequent injection of oxidant and/or catalyst as required. One of reasonable skill in the art will appreciate that at each successive oxidant application, the mass of PFAS destroyed would decline. This means that where PFAS concentrations are high, a great deal of PFAS mass can be destroyed in a cost-effective manner. Conversely, adding energy to destroy a comparable amount of PFAS in a low-concentration (dilute) plume is less effective.

Sufficient temperature required to achieve an in-situ thermal environment for the optimal reaction of oxidant and the metal catalyst may be attained through passive solar heating, or active heating generated by mechanical, electrical or chemical sources in the desired zone of treatment. In an illustrative embodiment, heating is performed by solar heating or by conductive heat transfer using heater wells installed into the soil. One or more heater wells are installed to create a temperature gradient in the soil to establish conductive heat transfer through the soil from the heater wells.

In an embodiment of the present invention, advanced oxidation techniques for PFAS have been described. Oxidants used in the disclosed invention include hydrogen peroxide (HP), peroxymonosulfate (PMS) and persulfate (PS). Amongst these oxidants, PS has the highest redox potential of 2.01 V compared to HP and PMS. A common feature among these oxidants is the loosely bounded oxygen atoms in the molecule which upon cleavage can generate highly oxidizing radical species. Upon activation, these oxidants produce highly oxidizing radical species such as hydroxyl radicals (·OH, HRs), sulfate radicals ($SO_4^{·-}$, SRs), and reducing radical species such as superoxide radical anions ($O_2^{·-}$, SRAs). Depending on the pH under which these radicals are produced they may be in the protonated or deprotonated form. The amount and type of radical species generated is dependent upon the activation method. For example, the number of SRs generated through UV is twice that generated though transition metals as seen in Eqs. x and y.

$$S_2O_8^{2-} + h\gamma \rightarrow 2SO_4^{·-} \qquad (x)$$

$$S_2O_8^{2-} + Fe^{2+} \rightarrow SO_4^{·-} + SO_4^{2-} + Fe^{3+} \qquad (y)$$

Similarly, PMS can be activated using UV to generate both SRs and HRs as seen in Eq. z.

$$9HSO_5^- + h\gamma \rightarrow SO_4^{·-} + OH· \qquad (z)$$

Along with the catalyst and the oxidant, the pH of the aqueous solution also plays a key role in the type of radical generated. Under alkaline conditions, PS generates higher amounts of HRs than SRs. Similarly, HP generates SRAs under alkaline condition as shown in Eqs. a-c.

$$H_2O_2 + Fe^{3+} \rightarrow HO_2\cdot + Fe^{2+} + H^+ \quad (a)$$

$$H_2O_2 + OH\cdot \rightarrow HO_2 + H_2O \quad (b)$$

$$HO_2\cdot \leftrightarrow O_2\cdot^- + H^+ \, pKa=4.8 \quad (c)$$

Neutral to acidic pH conditions are critical to the preferential generation of higher redox potential radicals (SRs) over lower redox potential radicals (HRs). One aspect of the present invention is that with a combination of silver+persulfate, pH drops naturally.

In one embodiment of the present invention each radical has a specific pathway of interaction leading to the decomposition of PFAS, e.g., SRs decompose PFAS through abstraction of an electron from the oxygen present in the carboxylic group, meanwhile HRs follow hydrogen abstraction to destabilize the molecule that eventually leads to its degradation. For certain PFAS with at least one carbon-hydrogen bond present in the molecule, particularly precursors like (6:2FTS), HRs are more effective than SRs. Although these methods can effectively activate the oxidants and degrade pollutants, the need for an external energy source greatly reduces the potential for in-situ application. Hence, one of the most efficient ways of activating an oxidant is through the use of a metal catalyst. A Fenton reaction involves the generation of HRs by activating HP with dissolved $Fe^{2+}$. Modified Fenton reactions are herein evolved to use different activators (catalysts) with different oxidants.

In a preferred embodiment of the present invention the best activator for PS was silver (I). $PS/Fe^{2+}$ and $PS/Co^{2+}$ were not effective at all, and only $PS/Ag^+$ showed noticeable decomposition of PFOA (experiments conducted with other oxidants such as HP and PMS conjugated with the metals did not show significant decomposition of PFOA. Fe, Co, and Ag are the best activators for HP, PMS, and PS, respectively. However, the best combination of an oxidant and a metal has been observed to depend on target chemicals and reaction conditions. The $PMS/Co^{2+}$ pair has been used to generate HRs and SRs for the decomposition of polyfluoroalkyl substances such as 6:2 fluorotelomer sulfonate, but not for perfluoroalkyl ones.

In some embodiments of the present invention, degradation of PFAS using advanced oxidation technologies (AOTs) are herein described. There have been tremendous efforts to develop technologies for treatment of extraordinarily stable PFAS in the environment, particularly in water. The present invention exploits destructive methods, (AOTs) using strong oxidizing radicals to decompose PFAS. Radicals, in particular sulfate radicals (SR; $SO4\cdot^-$) and hydroxyl radicals (HR; $\cdot OH$), are generated from chemical oxidants such as hydrogen peroxide (HP; $H_2O_2$), peroxymonosulfate (PMS; $HSO_5^-$), and persulfate (PS; $S_2O_8^{2-}$) when conjugated with transition metals through so-called Fenton-like reactions.

A specific example of a metal that may be utilized in some embodiments of the present invention is silver, which exhibits a strong potential as catalyst to facilitate the degradation of PFAS compounds.

Other examples of transition metals that may be used in some embodiments of the present invention include titanium, platinum, manganese, nickel and iron or a combination of thereof.

Figure 3:
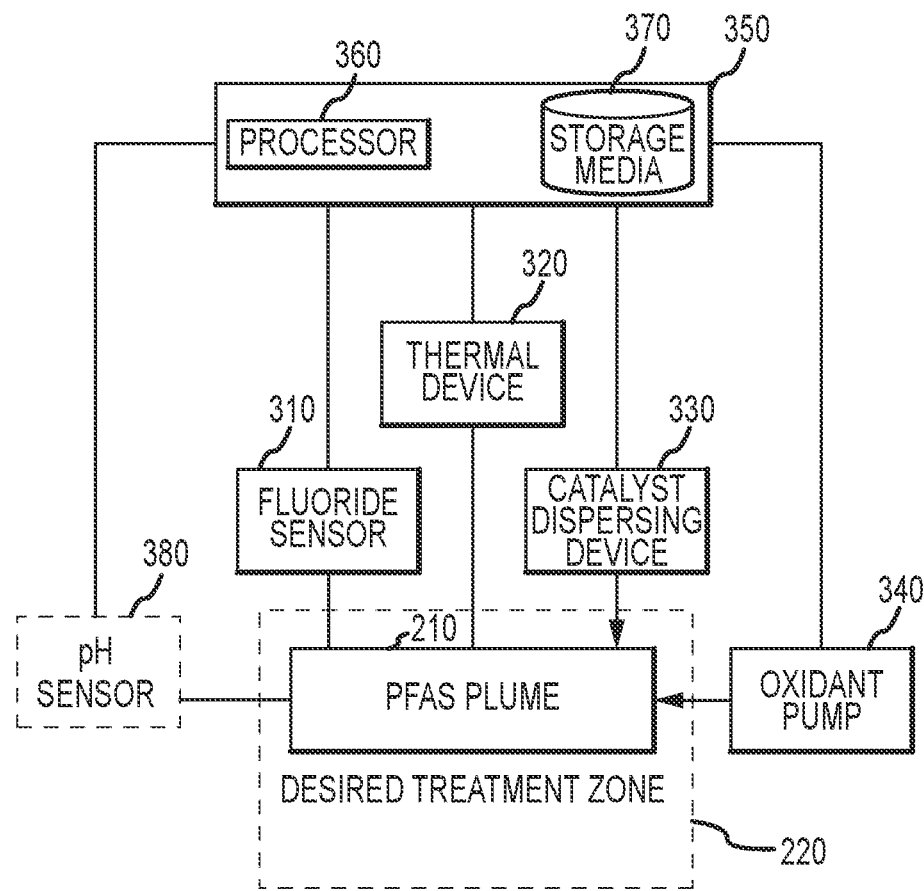
FIG. 3 shows a high-level block diagram for PFAS remediation system in accordance with one embodiment of the present invention.

FIG. 3 presents a high-level system diagram for PFAS remediation according to one embodiment of the present invention. In one embodiment the PFAS remediation system includes a fluoride sensor 310 to detect and measure an initial fluoride concentration in the PFAS plume 210, and the desired zone of treatment 220. As the remediation is ongoing the sensor repeatedly checks and reports on the fluoride concentration level within the desired treatment zone 220. As PFAS is remediated, fluoride concentrations within the zone 220 will raise. The rate at which fluoride concentrations rise will initially be positive until a point at which the lack of PFAS causes the rate of increase to stabilize and eventually approach zero, indicating that the reaction has stopped or that the fluoride concentrations have reached an equilibrium. In other embodiments of the present invention a pH sensor 380 is included to monitor acidity of the plume.

The system also includes a thermal device 320 configured to measure the thermal environment of the PFAS plum. As discussed herein the desired treatment zone 220 embodying the PFAS plum 210 is preferably greater than 20° C. In situations in which the temperature of the treatment environment is less than 20° C. (or some other desired temperature) the thermal device 320 can impart energy to the PFAS plum 210 desired treatment zone 220, raising the temperature to a desired level.

The present invention further includes a catalyst dispersing device 330 and an oxidant pump 340. Upon determining the scope size of the PFAS plum 210 and corresponding desired treatment zone 220, a designated amount of catalyst is dispersed into the plume. With the thermal environment achieved and with the treatment zone 220 enriched with catalyst, an oxidant is added to generate free radicals.

Included in the system for PFAS remediation is a control module 350 comprising, among other things, a processor 360 and a non-transitory storage media 370 embodying executable instructions. While the fluoride sensor(s) 310, the thermal device, catalyst dispersing device 330 and oxidant pump 340 are physically connected to the PFAS plume 210 and desired treatment zone 220 they are also communicatively coupled to the control module 350. As data from each sensor/device is collected and relayed to the control module, the processor, executing various instructions, monitors fluoride concentrations and concentration rates, as well as temperature, pH, and the amount(s) of catalyst and oxidant introduced to the plume.

The present invention creates a treatment environment suitable for the generation of free radicals which thereafter bind with and remediate the PFAS molecules. Each of these processes, according to one embodiment of the present invention, occurs within an in-situ PFAS plume.

Figure 4:
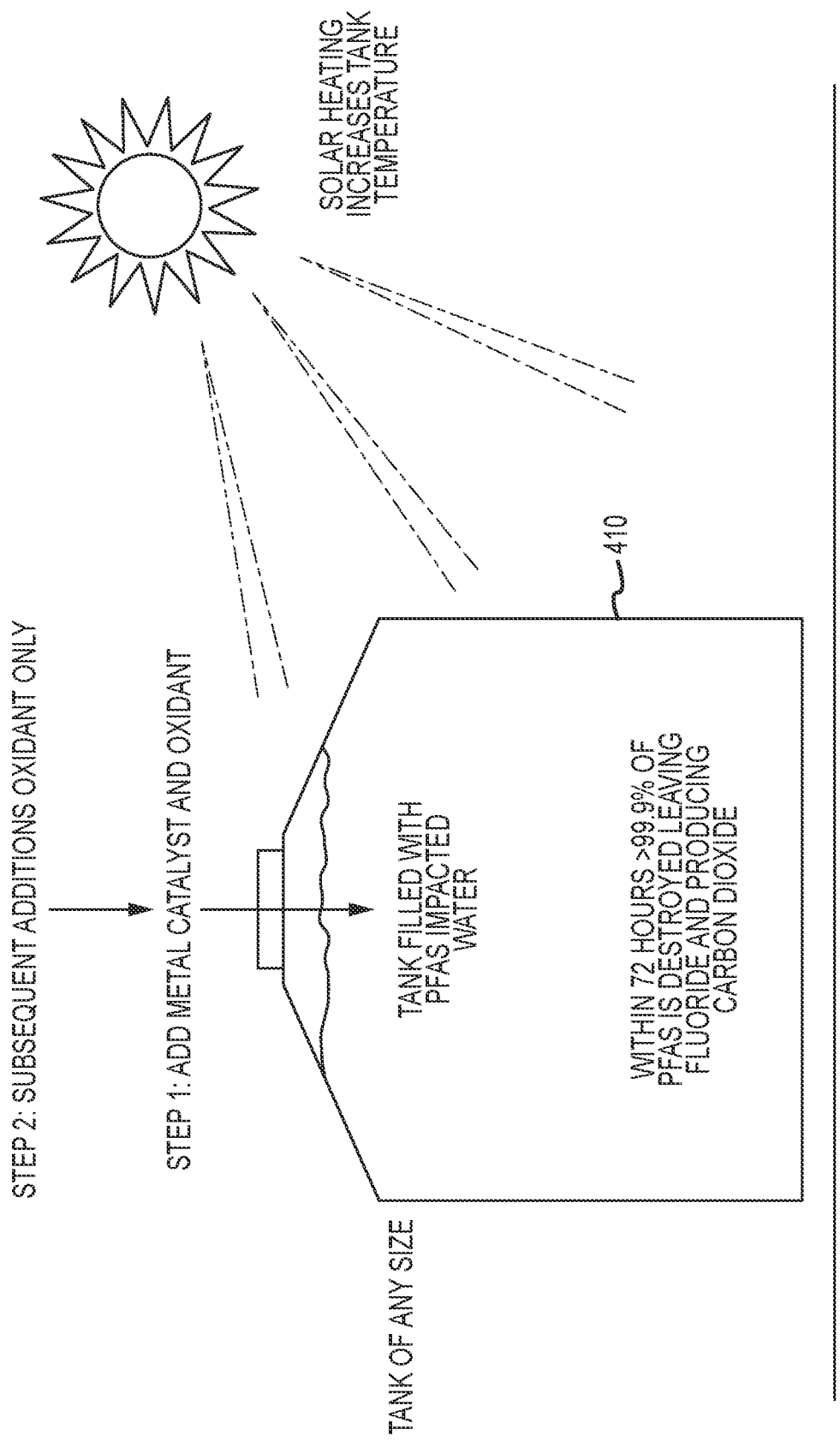
FIG. 4 is a perspective view of Ex-Situ Reactor for remediation of PFAS Impacted Water in accordance with one embodiment of the present invention.
Figure 5A:
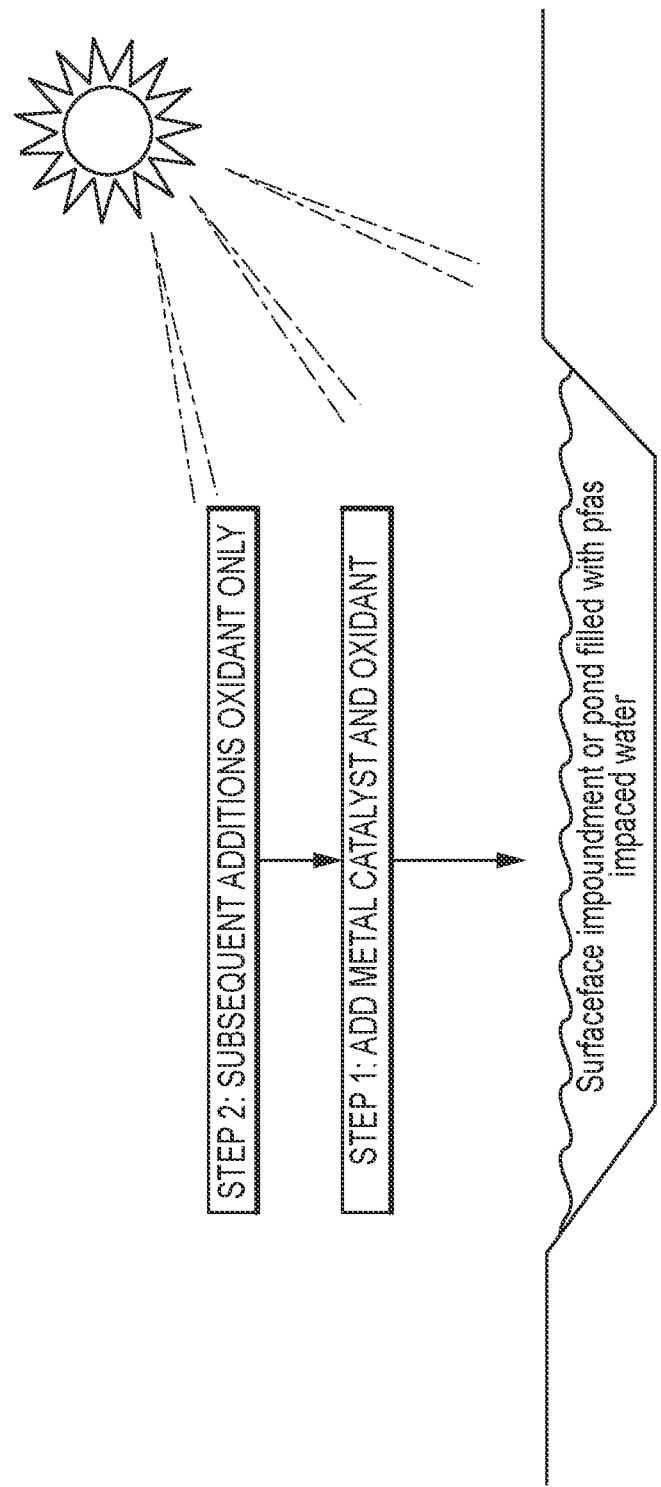
FIGS. 5A-5D presents an alternative approach for in-situ surface impoundment and remediation of PFAS vadose zone soils in accordance with one embodiment of the present.
Figure 5B:
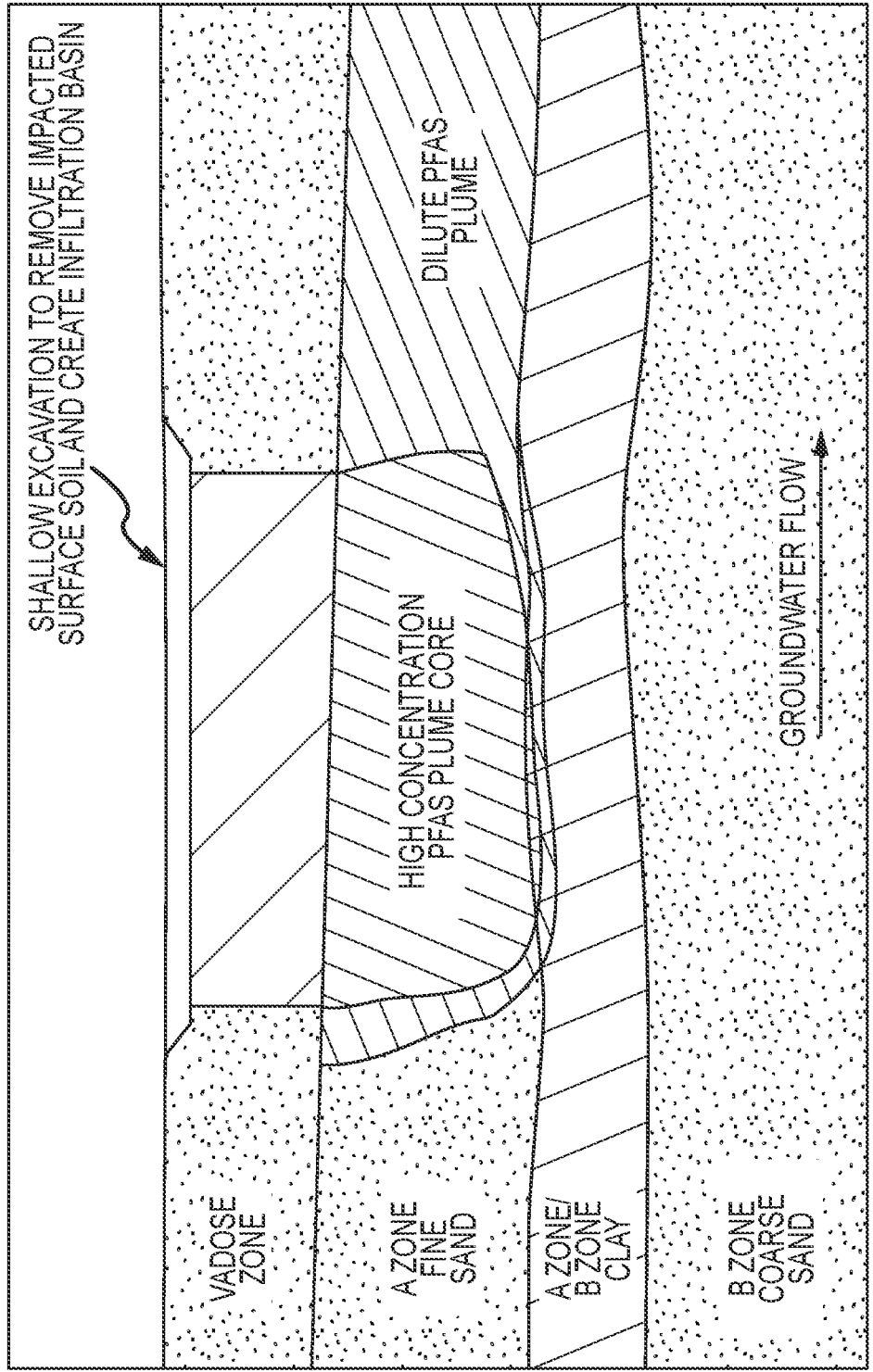
Figure 5C:
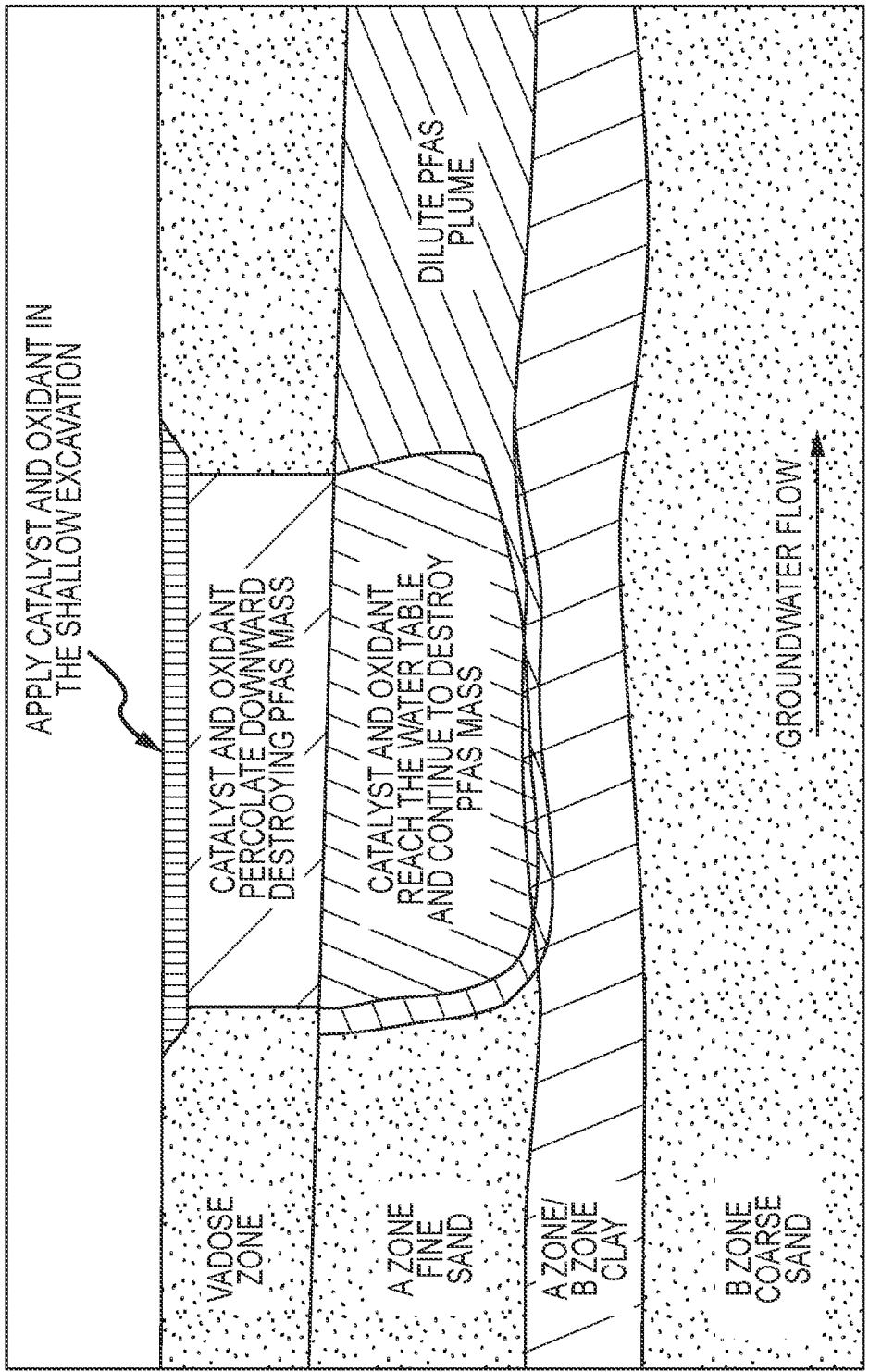
Figure 5D:
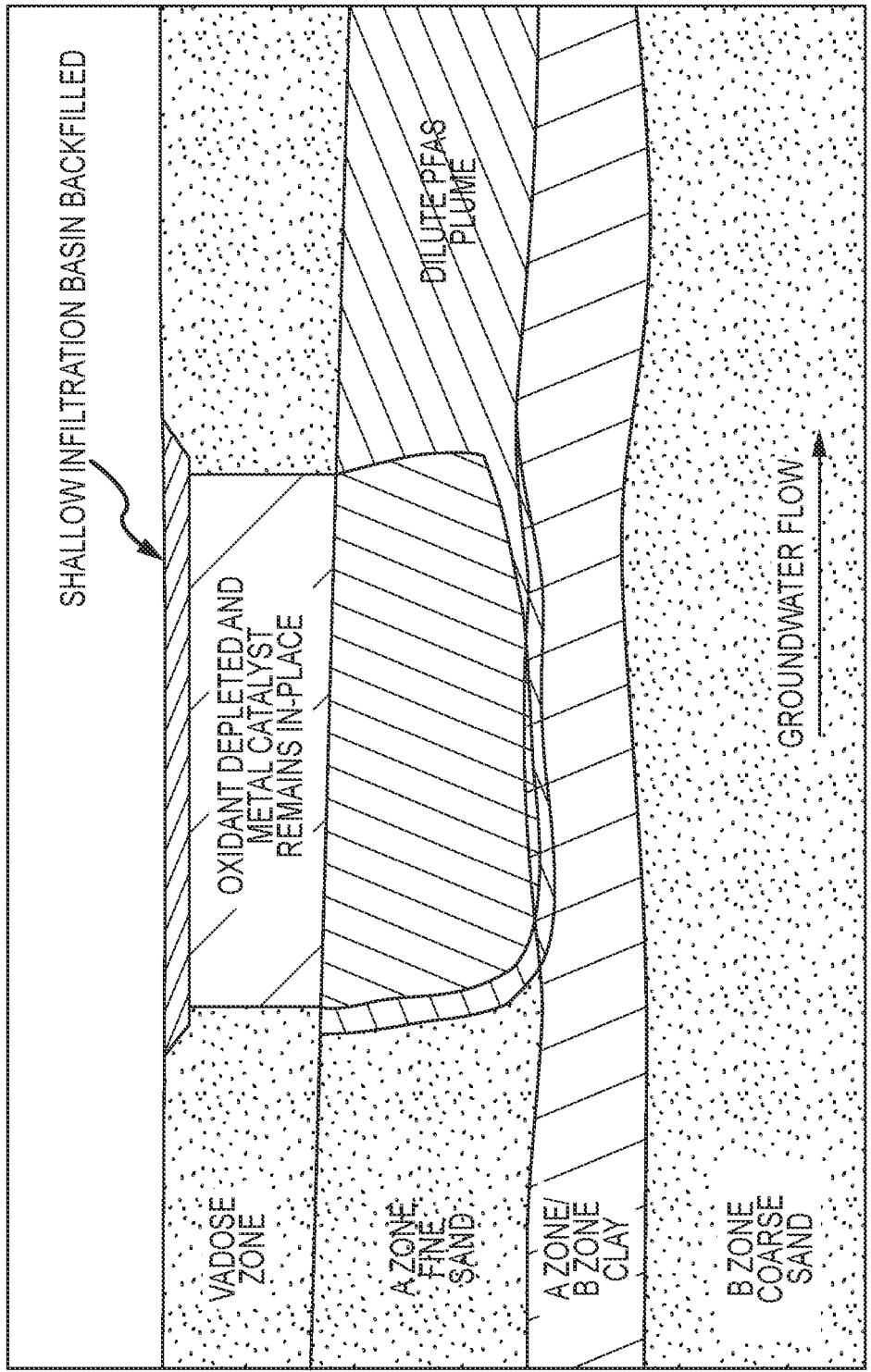

With attention now to FIG. 4, an ex-situ treatment process in which extracted groundwater is treated in a reactor above ground is shown. The above-ground reactor 410 could include a tank or other vessel, as shown in FIG. 4, and could also include a pond, surface impoundment, or any other water containment structure. As shown in FIG. 4, ex-situ treatment of the extracted groundwater may include, in some embodiments, treatment with one or more of the following reagents: persulfate, and a transition metal catalyst. In some particular embodiments, solar heating is used to increase the reactor temperature to create ambient in-situ thermal environment required for the optimal performance of the reagents, while in other embodiments electrical or other means to create a suitable thermal environment can be used. As with the in-situ process, degradation is initiated by the addition of metal catalyst to the contaminated water, followed by the addition of an oxidant. The release of fluoride is monitored as is the rate of change of fluoride concentrations. The amount of PFAS degraded is assessed by the concentration of fluoride released into the water as compared to the baseline level. The addition of oxidant and/or catalyst into the ambient in-situ thermal environment is continued until no further increase in fluoride concentration is observed in the water indicating lack of further PFAS remediation.

To illustrate the above-described process and to add clarity to the system implementation, consider the following example.

A PFAS contaminated site is identified and demarcated where high concentration of PFAS is detected in a source area or downgradient plume core. The PFAS source area, or desired application area, is defined through groundwater sampling with a constellation of performance monitoring wells installed. The starting groundwater fluoride concentration is measured within the desired zone of treatment identifying a baseline value, and baseline pH conditions are confirmed to be lightly acidic to within the neutral range. Baseline ambient temperature conditions are also defined to determine if heating is required to set ambient temperatures at above 20° C. SOD value is worked out which alone or in combination with site characterization data is used to estimate the quantity and ratio of oxidant and catalyst that is to be applied at the contaminated site. Injection wells are installed within the defined treatment area at appropriate spacing such that fluids to be injected will be distributed throughout the defined treatment area ensuring homogeneity of the reagents. Heating, if required, is applied in the desired treatment area, e.g., through injection of solar heated water or some other means, and a solution of water containing metal catalyst is injected to establish a metal catalyst rich condition with appropriate having a suitable temperature. Oxidant is then applied in successive injections of heated water containing oxidant to generate free radicals, thereby degrading PFAS in the desired treatment area. Fluoride concentrations, (and in some instances Sulfide concentrations) PFAS concentrations, pH, and temperature are monitored through groundwater sampling between successive oxidant injections, and oxidant injections are repeated until the desired degree of PFAS destruction is achieved.

In one embodiment of the present invention a method to calculate decay and defluorination of PFASs and Perfluorocarboxylic Acids (PFCAs) is based on the concentration of F⁻ released from the PFAS molecules into the aqueous solution, the overall defluorination ratio (deF %) is defined by the following equation.

$$\text{Overall } deF \% = \frac{CF^-}{C0 \times NC-F} = \frac{CF^-}{C0 \times NC-F} = \frac{CF^-}{C0 \times NC-F} = \frac{CF^-}{C0 \times NC-F}$$

where $CF^-$ is the molar concentration of $F^-$ ion released in solution, C0 is the initial molar concentration of the parent PFAS, and NC—F is the number of C—F bonds in the parent PFAS molecule. The described method determines a PFAS groundwater concentration within the desired zone of treatment 220 which can also be used for ascertaining a PFAS soil concentration within the same zone.

The point of injection in the vadose zone 230 is marked (see FIG. 2A). A first injection of hot water or similar energy source is accomplished, when required, to establish an environmental temperature sufficient for remediation. A metal catalyst is inserted followed by an oxidant initiates a reaction generating high redox potential free-radicals, eq (1), which subsequently oxidize PFAS compounds leading to a decrease of PFAS concentration. In this reaction, the oxidant is consumed, leaving the metal catalyst in place (see eq (2 & 3), FIG. 2B.)

$$Ag^+ + S_2O_8^{2-} \rightarrow Ag^{2+} + SO\cdot^-_4 + SO_4^{2-} \quad (1)$$

$$Ag^+ + SO_4\cdot^- \rightarrow Ag^{2+} + SO_4^{2-} \quad (2)$$

$$Ag^{2+} + RCO_2H \rightarrow Ag^+ + RCO_2\cdot + H^+ \quad (3)$$

Fluoride is a byproduct of PFAS remediation. A target groundwater fluoride concentration, generated through a combined destruction of the PFAS in soil and groundwater, is calculated within the desired zone of treatment. The concentration of PS in the injected solution is fixed, in one embodiment, at 0.005 M as a standard while ranging up to 0.6 M; the concentration of transition metals such as $Ag^+$, $Fe^{2+}$, and cobalt ($Co^{2+}$) is set, in one embodiment, at 0.6 mM while ranging up to 1.2 mM in the injected solution depending upon the SOD values. Reaction temperatures no less than 20° C., but ranging up to 60° C. in some embodiments is maintained and controlled through various heating mechanisms. The range of homogeneity is wide enough to assure adequate distribution. While there will be concentration gradients with highest concentrations near the injection points and lower further away, the variance does not significantly alter the ability of the present invention to remediate PFAS.

As the process is ongoing, samples from groundwater are taken. Sample preparation and analysis are conducted to identify fluoride concentrations as compared to a baseline value as well as a rate of change of fluoride concentrations. Aqueous fluoride ions detached from PFAS are measured in one embodiment by using a HQ 440D base combined with an Intellical ISE F121 electrode. In one embodiment the detection limit can be set at 0.02 mg/L with a Hach ionic strength adjuster (ISA) pack being diluted in 5 mL of water. Samples of 0.5 mL are diluted with 0.5 mL ISA stock solution prior to analysis. The concentration of PFAS remaining in contaminated zone are traced using high-performance liquid chromatography coupled with triple-quadrupole mass spectrometry (LC-MS/MS). Any disappearance of PFAS is ascribed to their chemical decomposition. Subsequent additions of heat (to control/maintain the thermal environment) and injections of oxidant and/or catalyst are given to achieve near complete destruction of PFAS in-situ. As a result, the PFAS mass is reduced by >99.9% after successive applications of oxidant and/or catalyst. In most instances, after the reaction the oxidant is depleted while the metal catalyst remains in-place. The amount of PFAS degraded is assessed by the concentration of fluoride released into the groundwater and final PFAS concentrations measured in groundwater. The injection of oxidant into the ambient in-situ thermal environment is continued, in most instances, until no further increase in fluoride concentration is observed in groundwater, or until the desired degree of PFAS destruction is achieved.

In one embodiment of the present invention a computer system is programmed to process the site characterization data of SOD, pH and temperature to estimate the quantity and ratio of oxidant and catalyst, which is automatically injected into the desired zone of treatment through the injection wells at the treatment site.

FIGS. 5A-5D show an application of the present invention for treatment in a surface impoundment/vadose zone soils. In such an application a surface structure or impoundment is recognized have a high PFAS content. Catalysts consistent with the present invention as added to the impoundment along with an oxidant. In many respects solar energy can be used to raise the impoundment temperature above 20 degrees Celsius. In instances in which solar energy is insufficient, hot water can be added to the impoundment site to render an acceptable thermal environment.

With a sufficient thermal environment established, and with both catalyst and oxidant present, remediation of PFAS can begin. Surface water application of catalysts and oxidant results in the destruction of PFAS compounds and generation of fluoride, carbon dioxide, and water. With fluoride concentrations being first measured and thereafter monitored, the rate and effectiveness of the remediation effort can be ascertained. In many instances, greater than 99.9% of PFAS is destroyed within 72 hours leaving fluoride and carbon dioxide. As the rate of fluoride concentration diminishes, and when the target concentration has yet to be obtained, additional oxidant can be added. Catalyst and oxidant percolate downward destroying PFAS mass in the vadose zone. Eventually the catalyst and oxidant reach the water table and continue to destroy PFAS mass. Upon reaching a target fluoride concentration, indicative of PFAS remediation, additive oxidant injections can halt leaving the catalyst in place.

Figure 6A:
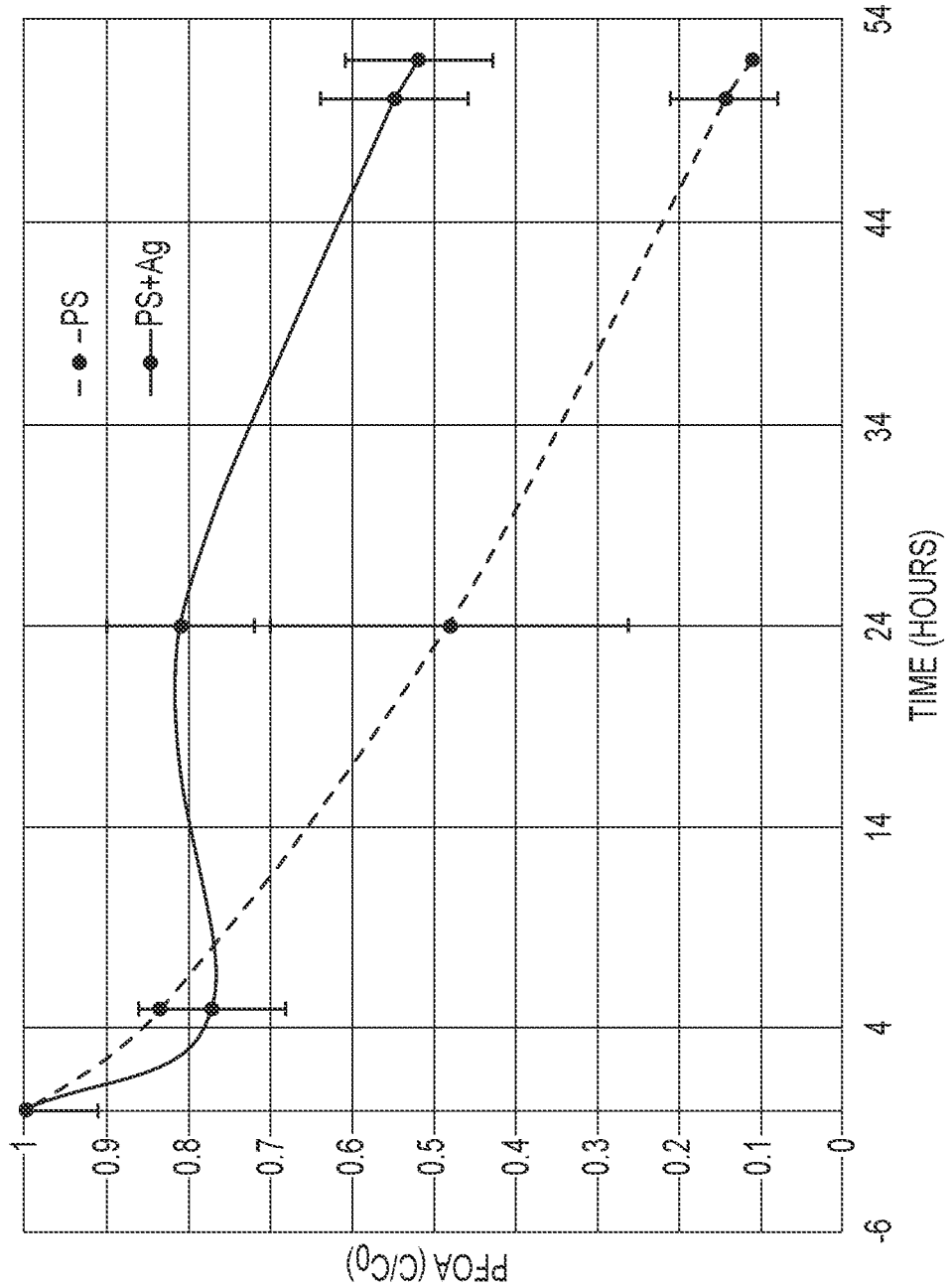
FIGS. 6A-6D present test data from application of one or more embodiments directed to remediation of PFAS in accordance with the present invention.
Figure 6B:
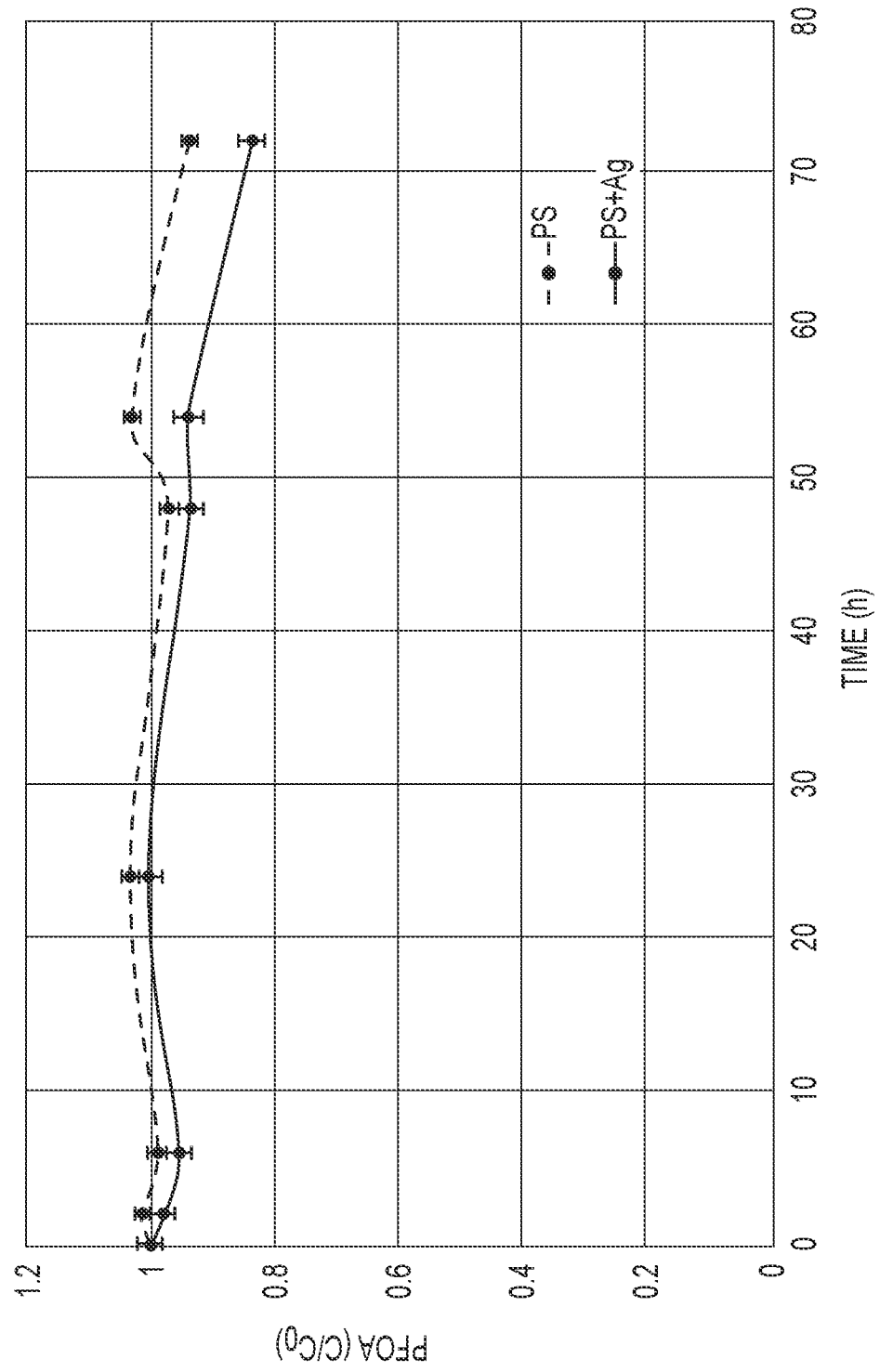
Figure 6C:
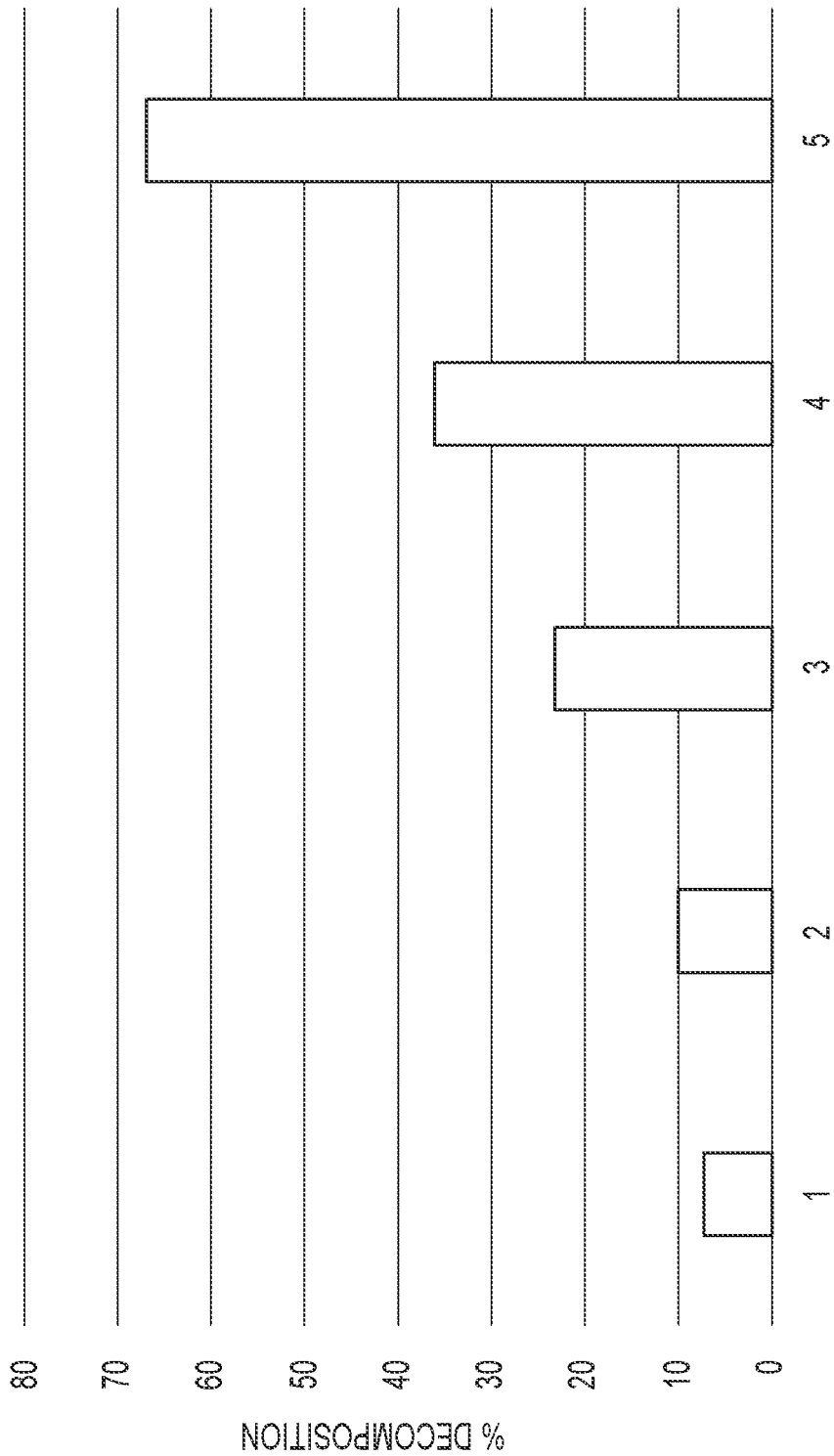

FIGS. 6A-6C presents a chart showing decomposition of PFOA at 60° C. by persulfate (PS) alone and persulfate (PS) in combination with silver (Ag). FIG. 6A shows that oxidant alone (PS) at high temperatures (60° C.) can degrade approximately 90% of PFOA whereas nearly 50% decomposition of PFOA can be achieved by the combination of oxidant (PS) and catalyst (Ag) within 54 hours. As described herein, when the temperature is reduced the catalyst plays a significant role in activating the oxidant and generating the radicals capable of degrading PFOA as seen in FIG. 6B. FIG. 6B presents decomposition of PFOA at 40° C. by oxidant (PS) alone and oxidant (PS) in combination with catalyst (Ag).

Figure 6D:
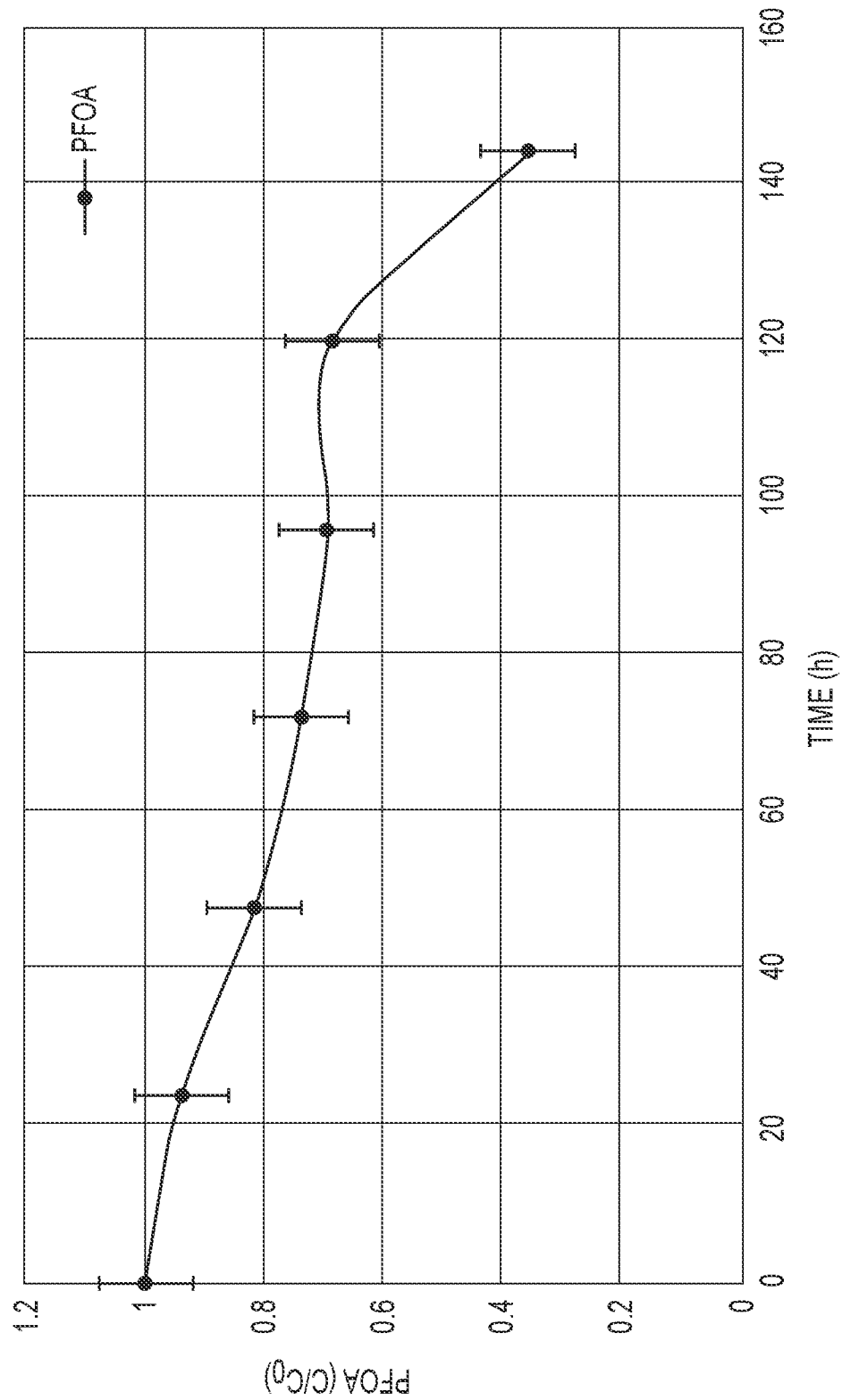

Lastly, FIG. 6C shows decomposition of PFOA by oxidant in combination with catalyst at 40° C., wherein oxidant was continuously injected up to 5 times for an incremental decomposition. As seen in FIG. 6C, a single catalyst dose was applied and after every 24 hours an oxidant dose was applied to achieve nearly 67% decomposition of PFOA. Similar applications of the processes described herein can be conducted in the presence of soil wherein PFOA was spiked in the mixed matrix containing water and soil mixture as seen in FIG. 6D. In one embodiment catalyst is added once with oxidant applied every 24 hours thereafter up to 140 hours for a steady decomposition of PFOA after every oxidant injection to achieve a final decomposition of approximately 63% over 6 days. The increase in decomposition rate of the PFOA from day 5 to day 6 is aligned with a significant reduction of organic matter in soil to overcome the soil oxidant demand due to previous oxidant injections. These results are highly impactful and pertain to PFOA contamination in the vadose zone and saturated zone soils.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

In a preferred embodiment, one or more portions of the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

An exemplary system for implementing the invention includes a general-purpose computing device including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the personal computer, such as during start-up, is stored in ROM. Such a processing device may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. It should be appreciated by those skilled in the art that other types of computer readable media which can store data that is accessible by a computer may also be used in the exemplary operating environment.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. A method for remediation of per- and polyfluoroalkyl substances (PFAS), the method comprising: forming an in-situ zone of treatment wherein forming includes measuring an initial groundwater fluoride concentration within the in-situ zone of treatment and verifying a thermal environment within the in-situ zone of treatment having a temperature >20 degrees centigrade;
dispersing an initial quantity of a transition metal catalyst into the thermal environment creating a catalyst rich thermal environment;
introducing to the catalyst rich thermal environment an initial quantity of an oxidant, wherein the initial quantity of the oxidant and the initial quantity of the transition metal catalyst within the catalyst rich thermal environment are at an initial molar ratio between 1:10-1:250, generating high redox potential free-radicals thereby oxidizing PFAS compounds by the high redox potential free-radicals producing, inter alia, fluoride;
calculating a rate of change of groundwater fluoride concentration within the in-situ zone of treatment;
monitoring the rate of change of groundwater fluoride concentration within the in-situ zone of treatment;
introducing an additional quantity of oxidant to the catalyst rich thermal environment if the rate of change of groundwater fluoride concentration in the catalyst rich thermal environment is not substantially zero until the rate of change of groundwater fluoride concentration in the catalyst rich thermal environment is substantially zero;
optionally adding an additional quantity of the transition metal catalyst in the catalyst rich thermal environment; and
responsive to the rate of change of groundwater fluoride concentration in the catalyst rich thermal environment being substantially zero upon introduction of the additional quantity of oxidant and replenishing of the transition metal catalyst, dispersing an additional quantity of the transition metal catalyst to the catalyst rich thermal environment until the rate of change of groundwater fluoride concentration in the catalyst rich thermal environment is substantially zero,
wherein the oxidant is a peroxy-based material or a sulfur-based material.

2. The method of claim 1, wherein the oxidant is persulfate.

3. The method of claim 1, wherein the transition metal catalyst is silver.

4. The method of claim 2, wherein the oxidant is hydrogen peroxide.

5. The method of claim 1, wherein the transition metal catalyst is uniformly dispersed throughout the in-situ zone of treatment.

6. The method of claim 1, wherein the transition metal catalyst is regenerated for each cycle of oxidation.

7. The method of claim 1, wherein the transition metal catalyst is regenerated upon interacting with the oxidant.

8. The method of claim 1, wherein the transition metal catalyst is regenerated by decarboxylation of a carboxylic group.

9. The method of claim 1, further comprising replenishing the transition metal catalyst responsive to monitoring a rate of release of fluoride in groundwater.

10. The method of claim 1, further comprising destroying the PFAS as they are flushed through a vadose zone, thereby addressing current and preventing subsequent groundwater contamination.

11. The method of claim 1, wherein the in-situ zone of treatment includes an inorganic compound in the form of an aqueous solution.

12. The method of claim 1, wherein the molar ratio of the oxidant to catalyst is of the order of 1:10-1:150.

13. The method of claim 1, wherein the thermal environment is $\geq 20$ degrees centigrade and $\leq 35$ degrees centigrade.

14. The method of claim 1, wherein the thermal environment is $\geq 20$ degrees centigrade and $\leq 30$ degrees centigrade.

15. The method of claim 1, wherein the thermal environment is $\geq 20$ degrees centigrade and $\leq 40$ degrees centigrade.

16. The method of claim 1, wherein the oxidant is consumed after producing free radicals.

17. The method of claim 1, wherein the PFAS compounds comprise one or more per- and polyfluoroalkyl acids or conjugate bases thereof.

18. The method of claim 1, further comprising calculating a soil oxidant demand (SOD) value, and wherein the SOD value is used to estimate the initial quantity of the transition metal catalyst, the initial quantity of the oxidant, and the initial molar ratio.

19. The method of claim 1, further comprising verifying a pH condition in the in-situ zone of treatment between neutral pH and acidic pH.

20. The method of claim 1, wherein the transition metal catalyst is added to the in-situ zone of treatment by use of a catalyst dispersing device, and the oxidant is added to the zone of treatment by use of an oxidant pump.

* * * * *